Figure 1:
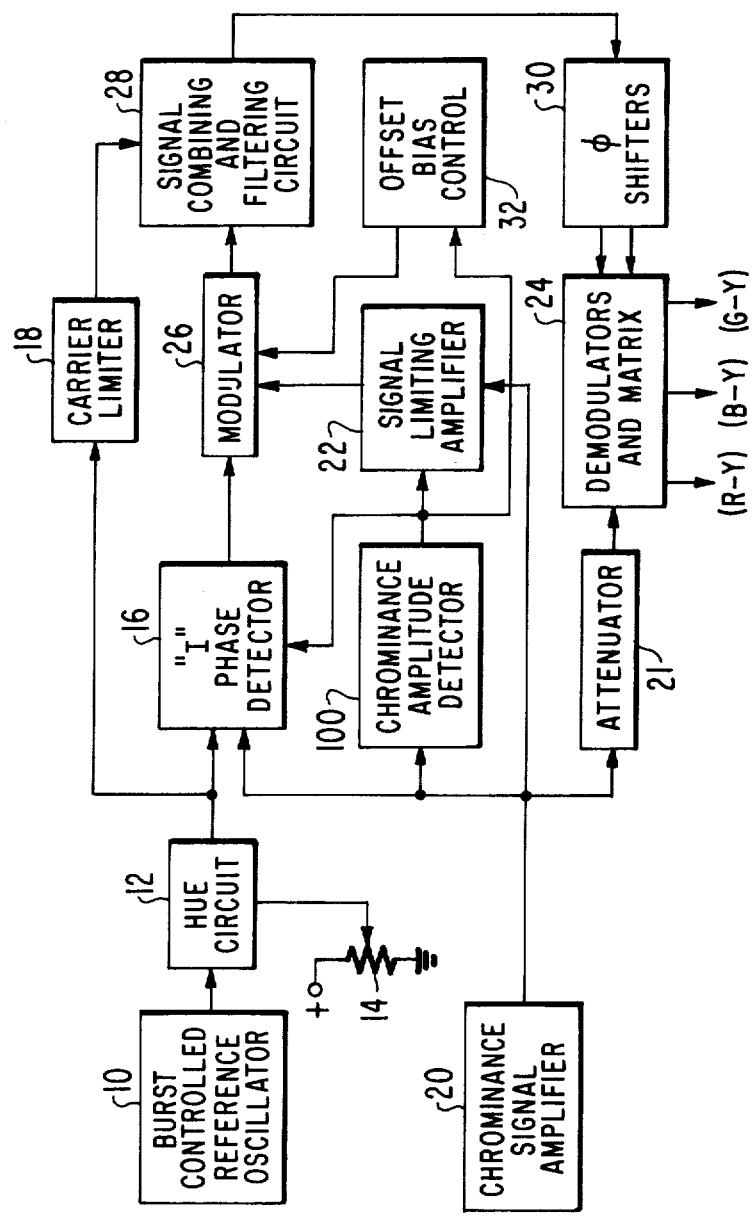

United States Patent [19]
Cochran

[11] 4,051,510
[45] Sept. 27, 1977

[54] HUE CORRECTION APPARATUS CONTROLLED BY CHROMINANCE SATURATION

[75] Inventor: Larry Allen Cochran, Indianapolis, Ind.

[73] Assignee: RCA Corporation, New York, N.Y.

[21] Appl. No.: 683,391

[22] Filed: May 5, 1976

[51] Int. Cl.[2] .......................................... H04N 9/535
[52] U.S. Cl. .......................................... 358/28
[58] Field of Search .......................................... 358/28

[56] References Cited
U.S. PATENT DOCUMENTS

| 3,708,614 | 1/1973 | Nakabe et al. | 358/28 |
| 3,871,023 | 3/1975 | Caprio | 358/28 |

OTHER PUBLICATIONS

"A Novel Automatic Hue Control System", IEEE Transactions on Consumer Electronics, vol. CE-21 No. 2 May 1975, pp. 155-163.

*Primary Examiner*—Robert L. Richardson
*Attorney, Agent, or Firm*—Eugene M. Whitacre; Ronald H. Kurdyla

[57] ABSTRACT

Automatic hue correction apparatus of the general type described in U.S. Pat. No. 3,663,744 is modified to provide a reduction in flesh tone hue correction as a function of chrominance signal level. Chrominance signals are monitored on a dynamic basis and the phase of a color subcarrier reference signal is automatically altered when the chrominance signals are in the vicinity of the flesh tone (+I) axis. The phase of the reference subcarrier is altered by controllably adding a portion of an amplitude limited chrominance signal to the subcarrier so as to shift the subcarrier phase towards the phase of the chrominance signal. A normal phase correction range of the apparatus is controllably inhibited in the presence of relatively large amplitude chrominance signals representative of saturated colors.

11 Claims, 2 Drawing Figures

HUE CORRECTION APPARATUS CONTROLLED BY CHROMINANCE SATURATION

This invention relates to color television signal processing apparatus and, in particular, to apparatus for automatically compensating for errors in signal components which can result in improper reproduction of flesh tones.

It is known that, in the process of reproducing images from received color television signals, the phase relationship between the transmitted color reference carrier and the color image-representative (chrominance) signals may vary due to a number of factors such as atmospheric conditions, switching from one signal source to another at the studio or switching from one channel to another at the receiver. The effect of such variations on the reproduced image is to cause errors in hue and is particularly discernible by the viewer where the image includes flesh tones (that is, tones represented by signals in the orange or "+I" axis region). A number of systems have been utilized to provide automatic flesh tone correction in color television receivers. Such systems generally distort the reproduction of at least some portion of the color spectrum and, in some instances, distort the amplitude of the color signals as well.

A system described in U.S. Pat. No. 3,663,744, granted May 16, 1972 to L. A. Harwood provides a desired correction of tones around the flesh axis without introducing amplitude or saturation distortion into the color (chrominance) signals. In this system, hue control is provided by altering the phase of the color subcarrier reference signal before application of this signal to color demodulators. Phase alteration is accomplished by monitoring the chrominance signals prior to demodulation to determine if they possess phase components in the vicinity of the flesh axis. If such components exist, the chrominance signal is vectorially added to the reference signal to provide a differently phased reference signal which, when applied to the demodulators, causes them to provide color signals more closely representative of flesh tone. The principles described in this patent are employed in the circuit arrangement to be described subsequently.

In the design of flesh tone correction circuits, it is desirable to restrict the range of angles over which the correction is applied so as to more accurately reproduce colors such as green and blue, which are displaced by a significant angle from the flesh tone axis. Such operation is provided by a system described in a co-pending U.S. Pat. application Ser. No. 580,681, filed May 23, 1975 in the name of L. A. Harwood and assigned to the same assignee as the present invention, now U.S. Pat. No. 3,996,608, issued Dec. 7, 1976.

In the design of flesh tone correction circuits, it may also be desirable to modify the color phase correction as a function of the amplitude of the chrominance signals. Chrominance signals representative of flesh tones are typically of relatively low amplitude, since flesh tones are typically of low saturation. It is therefore desirable to reduce the flesh correction in the presence of relatively large amplitude chrominance signals, representing high saturation colors, when within the normal flesh correction range.

In accordance with the present invention, chrominance signals are monitored dynamically and the phase of a color subcarrier reference signal is automatically altered when the chrominance signals are in the vicinity of the flesh tone (+I) axis. The phase of the reference subcarrier is altered by controllably adding a selected amplitude portion of chrominance signal to the subcarrier to shift the subcarrier phase towards the phase of the chrominance signal. Control means responsive to the amplitude of the chrominance signal provides a control signal for reducing the amplitude of the selected amplitude portion of the chrominance signal. The amount by which the subcarrier phase is shifted toward the phase of the chrominance signal is thereby reduced in the presence of chrominance signals having an amplitude representative of relatively saturated colors.

Figure 2:
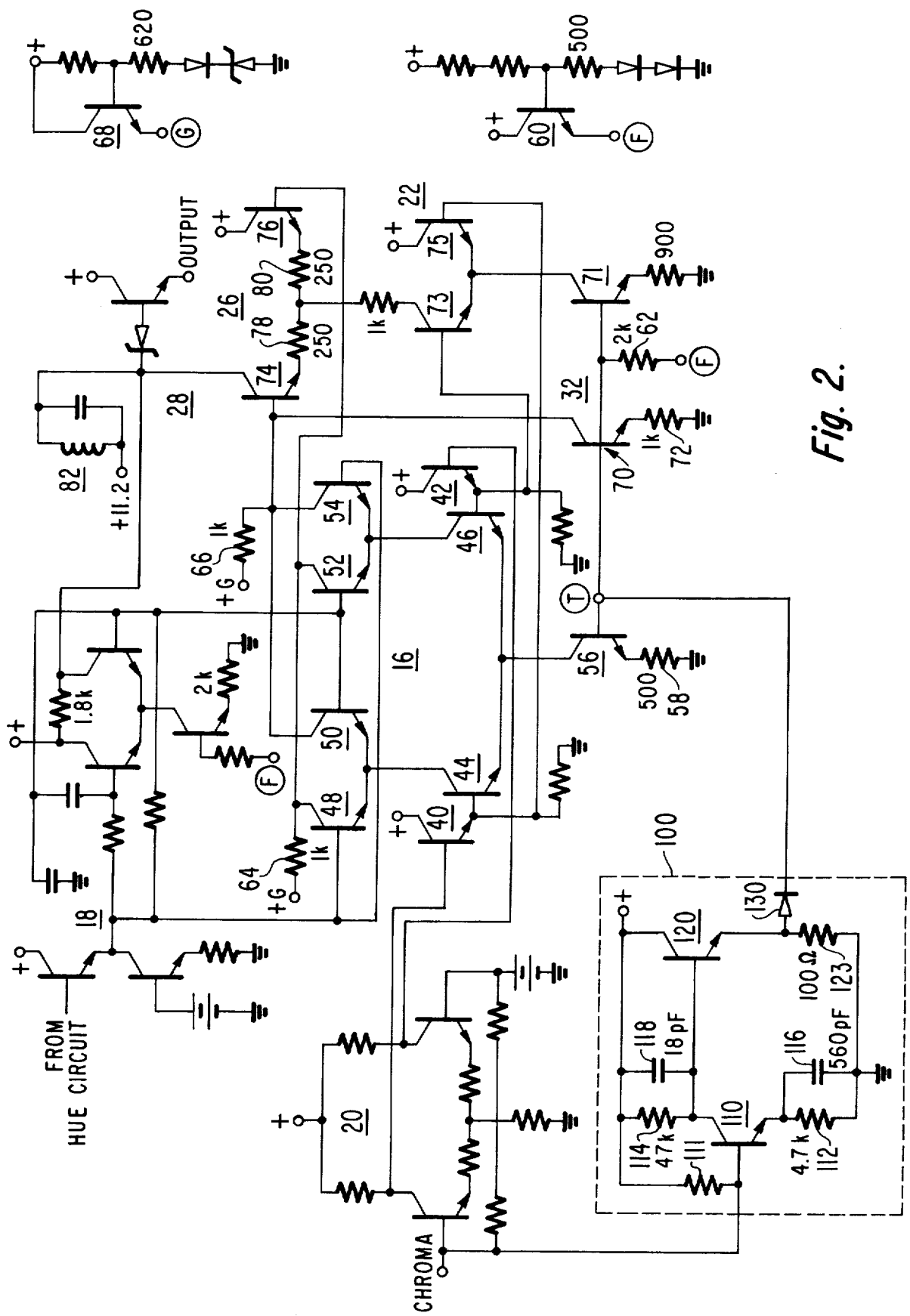

In the drawings:

FIG. 1 is a block diagram of a chrominance signal processing circuit including an automatic flesh tone correction circuit in accordance with the present invention; and FIG. 2 is a detailed circuit schematic diagram of a portion of the apparatus of FIG. 1.

Referring to FIG. 1, a reference color oscillator 10, arranged to provide a continuous wave output at the color subcarrier frequency (e.g., 3.58 MHz), is locked in phase and frequency to the color burst signal customarily provided in a broadcast color television signal. The output of reference oscillator 10 is applied to a hue (tint) control circuit 12 which may be adjusted either electronically or manually, for example, by means of a potentiometer 14 to shift the phase of the oscillator signal and thereby effect a change in hue of the image to be reproduced. The continuous subcarrier wave output of hue control circuit 12 is supplied both to one input terminal of an "I" axis phase detector 16 and to a carrier limiter 18.

Chrominance signals are supplied from a chrominance signal amplifier 20 to a second input terminal of "I" axis phase detector 16, and to a demodulator and matrix arrangement 24 via an attenuator 21. The level of the chrominance signals is sufficient to cause phase detector 16 to operate in a non-linear (limiting) mode with respect to the chrominance signals. Attenuator 21 reduces the level of the chrominance signals to a level within a linear range of the demodulators. The chrominance signals are also coupled to a chrominance signal limiting amplifier 22 and to a chrominance signal amplitude detector 100. Detector 100 provides an output control signal representative of the amplitude of the chrominance signal. The control signal is coupled to a control input which, as will appear below in connection with FIG. 2, is common to phase detector 16, limiting amplifier 22 and offset bias control 32. The control signal varies the output response of the flesh tone correction apparatus in accordance with the amplitude of the chrominance signals.

The limited chrominance signal output of limiting amplifier 22 is supplied to one input of a modulator circuit 26. The output of "I" axis phase detector 16, which is the product of the applied chrominance and reference carrier signals, is applied as a gating signal to a second input of modulator 26 to vary the amplitude of the amplitude-limited chrominance signal coupled to a signal combining and filtering circuit 28. The limited amplitude carrier signal supplied by carrier limiter 18 is vectorially added to the selected portion of the amplitude limited chrominance signal in combining and filtering circuit 28. A resultant phase corrected carrier signal is coupled via appropriate phase shifters 30 to demodulator and matrix circuit 24. The demodulator portion of circuit 24 includes, for example, "I" and "Q" signal amplitude detectors which provide corresponding chroma signal outputs. These chroma signal outputs are then combined within demodulator and matrix circuit 24 to provide, for example, (R-Y), (B-Y) and (G-Y) color difference signal outputs. An offset bias control arrangement 32 is coupled to modulator 26 to select the range of chrominance signal phase angles over which modulator 26 operates.

In the operation of the system of FIG. 1, the phase of the color subcarrier regenerated by oscillator 10 may be adjusted by a viewer by means of hue control potentiometer 14. This phase adjusted subcarrier proceeds through carrier amplitude limiter 18, a tuned filtering portion of circuit 28 (tuned, for example, to 3.58 MHz) and a portion of phase shifter 30 to the "I" signal demodulator portion of demodulator and matrix circuit 24. The other output of phase shifter 30 provides, for example, a 90° phase shift to produce a carrier signal appropriate for application to the "Q" signal demodulator portion of demodulator and matrix circuit 24. Resultant demodulated "I" and "Q" chroma signals are filtered and matrixed to produce the desired color difference signal outputs in a known manner.

The illustrated flesh tone correction circuitry operates on the premise that the hue control potentiometer 14 is adjusted by the viewer at some instant of time to reasonably reproduce flesh tones. The "I" phase detector 16, which is arranged to detect phase characteristics of the chrominance signal along the same axis as that along which the "I" amplitude demodulator of demodulator and matrix circuit 24 operates, will then be aligned to detect a chrominance signal phase in the vicinity of flesh tones. In that case, "I" phase detector 16 multiplies the applied chrominance and subcarrier signals to provide a maximum output when the applied chrominance signal phase is coincident with the "I" axis, and a decreasing output is provided as the signal departs from the "I" axis. Thus, when the supplied chrominance signals are in the vicinity of flesh tones, phase detector 16 controls the transfer characteristic of modulator 26 to pass more or less the amplitude-limited chrominance signal output of amplifier 22 according to the phase displacement between the "I" reference phase carrier and the chrominance signals. The resulting controlled portion of the amplitude limited chrominance signal combines with the limited reference subcarrier in signal combining and filtering circuit 28 to produce a new reference carrier, the phase of which is shifted towards that of the chrominance signal. When the chrominance signals are demodulated with respect to the new reference carrier in demodulator 28, the effect is phase compression of signals having "I" components.

For chrominance signals with negative "I" components, modulator 26 blocks passage of the chrominance signals and, therefore, no correction is applied. In order to avoid distortion of green and blue tones, the response of modulator 26 is further modified by means of offset bias control 32 so as to reduce the conduction angle of modulator 26 to less than 180°. This operation is described in greater detail in the previously mentioned co-pending Harwood U.S. patent application.

Chrominance detector 100 serves to controllably inhibit the response of the flesh tone correction apparatus in the presence of chrominance signals of relatively large amplitude. This is accomplished by controlling the conduction characteristics of limiting amplifier 22 (as well as phase detector 16 and bias control 32) in response to the control signal provided by detector 100.

In FIG. 2, the various portions of the circuit which correspond to portions of the block diagram of FIG. 1 are labelled with corresponding reference numbers. Chrominance signal amplifier 20 (a differential amplifier) provides push-pull chrominance signals via emitter followers 40, 42 to phase detector 16, the latter comprising six transistors 44, 46, 48, 50, 52, 54 arranged in a multiplier configuration. Operating current is supplied to the multiplier via a current source transistor 56, the emitter of which is returned to ground via a resistor 58. The operating current of transistor 56 is normally determined by a first bias supply 60, the output (F) of which is coupled via a resistor 62 to the base of transistor 56.

Wide bandwidth load circuits comprising load resistors 64 and 66 are coupled respectively between a second supply voltage (G) provided by a second bias supply 68 and the joined collector outputs of transistors 48, 52 in the one case and transistors 50, 54 in the other case.

Offset bias control 32 comprises a transistor 70 having an emitter electrode returned to ground via a resistor 72, a base electrode coupled to the first bias supply 60 via resistor 62 and a collector electrode coupled to the base of one transistor 74 of modulator 26. Modulator 26 further comprises a second transistor 76 coupled in differential fashion to transistor 74. Emitter degenerating resistors 78, 80 are associated with transistors 74 and 76. Limiting amplifier 22 comprises a pair of differentially connected transistors 73 and 75 supplied with push-pull amplified chrominance signals via transistors 42 and 40. Operating current is supplied to limiting amplifier 22 via a current source transistor 71. The operating current of transistor 71 is also normally determined by the output (F) of bias supply 60. Limited chrominance signals are coupled from limiter 22 to the junction of resistors 78 and 80. The collector of transistor 74 is coupled to the signal combining circuit 28 which includes a resonant circuit 82 tuned to the color subcarrier frequency (e.g., 3.58 MHz). The bases of transistors 74 and 76 are coupled to the two output terminals of "I" phase detector 16 associated with load resistors 66 and 64, respectively.

Chrominance signal amplitude detector 100 includes a peak detector transistor 110. A bias resistor 114 and a high frequency signal bypass capacitor 118 are coupled between a collector output of transistor 110 and a source of operating potential (+). An emitter of transistor 110 is coupled to ground by a resistor 112 and a detector filter capacitor 116. A base input of transistor 110 is forward biased a predetermined amount by a resistor 111. Detected signals representative of the amplitude of applied chrominance signals appear at the collector of transistor 110 and are coupled via an emitter follower buffer transistor 120 and an offset diode 130 to a control terminal T.

The operation of the circuit of FIG. 2 will first be described for normal signal conditions, when the chrominance signals are of relatively small amplitude (low saturation) below a predetermined level and of a phase within the normal correction range of the circuit. For this condition, detected signals provided by transistor 110 and capacitor 116 of amplitude detector 100 are D.C. translated by transistor 120. A voltage appearing at the emitter of transistor 120 is substantially equal to the bias voltage normally present at the base electrodes of transistors 56, 70 and 71, plus the voltage drop (about 0.7 volt) across diode 130. Transistors 56, 70 and 71 are therefore biased for normal operation of phase detector 16, offset bias control 32 and limiting amplifier 22.

The push-pull amplitude modulated chrominance signals developed by amplifier 20 are coupled via follower transistors 40, 42 both to the "I" phase detector 16 and to chrominance signal limiting amplifier 22. Amplifier 22 removes the signal amplitude variations from the signal and provides an amplitude limited chrominance signal in which the phase information of the chrominance signal is preserved. The portion of this limited chrominance signal which is passed through modulator 26 to tuned circuit 82 is a function of the instantaneous potentials at the bases of transistors 74, 76. These potentials are determined in the first instance by the operation of "I" phase detector 16.

The multiplier operation of the wide bandwidth phase detector 16 produces a gating signal at one output of multiplier 16 (e.g., at the base of transistor 74) which is asymmetrical with respect to a reference axis. It should be noted that the output of phase detector 16 is not filtered. Hence, the asymmetrical waveform is produced. This wide bandwidth operation is desirable in order to provide appropriate phase correction even when there are relatively rapid color transitions in the chrominance signal. The wide bandwidth operation of phase detector 16, however, has the undesired effect of extending the correction range towards the green and blue color regions. In order to avoid this result, the offset bias control circuit 32, which provides additional current through resistor 66, is arranged to shift the bias of transistor 74 relative to transistor 76 in a direction towards cutoff as described in the previously mentioned Harwood co-pending U.S. application.

The limited chrominance signal which passes through modulator 26 (transistor 74) is modified by the asymmetrical gating signal from phase detector 16 to produce an unfiltered limited chrominance signal at the collector of transistor 74. Upon application to signal combining circuit 28, the latter signal will be combined with a limited reference subcarrier signal from limiter 18 to produce a resultant reference carrier, the phase of which has been shifted towards the chrominance signal phase.

Chrominance signal amplitude detector 100 reduces the potential at the base electrodes of transistors 56, 70 and 71 of phase detector 16, offset bias control 32 and limiting amplifier 22, respectively, when the peaks of the chrominance signal applied to the base of transistor 110 exhibits an amplitude above the predetermined level. Chrominance signals of such amplitude are considered to be representative of relatively saturated color information. For purposes of the following explanation, it is assumed that such chrominance signal exhibits a phase within the normal flesh tone correction range of the circuit.

The conduction of transistor 110 increases as the amplitude of the chrominance signal increases. The potential appearing at the collector of transistor 110 and therefore the conduction of transistor 120 decrease correspondingly. The potential appearing at the emitter of transistor 120 and the potential appearing at control terminal T are accordingly reduced.

The reduced potential, or control signal, applied to the base of transistor 56 via terminal T serves to reduce the conduction of transistor 56. The operating current and hence the gain of phase detector 16 are diminished accordingly, so that the amplitude of the asymmetrical gating signal from phase detector 16 is attenuated. The control signal also serves to reduce the conduction of transistor 71. The operating current and gain of limiting amplifier 22 therefore decreases, causing the amplitude of the limited chrominance signal which is coupled to modulator 26 from limiting amplifier 22 to be attenuated. The current in transistor 70 is also decreased a corresponding amount.

The two attenuated signals coupled to modulator 26, produce an unfiltered limited chrominance signal of reduced amplitude at the collector of transistor 74. Upon application to signal combining circuit 28, this signal will be combined with the limited subcarrier signal from limiter 18 to produce a resultant reference carrier, the phase of which will be shifted less towards the chrominance signal phase than would be the case where circuit 100 is not operative. The amount by which the phase shift is reduced is related to the amount by which the gating signal and the limited chrominance signal are attenuated, which in turn is related to the amount by which the control potential at terminal T is reduced. Thus, the phase correction response of the correction circuit is diminished in the presence of high saturation chrominance signals of a phase within the normal correction range of the circuit.

Although the invention has been disclosed in terms of a particular embodiment, it should be appreciated that other arrangements may be devised by those skilled in the art without departing from the scope of the invention. For example, the control signal provided by detector 100 may be applied either to phase detector 16 or to limiting amplifier 22, or to both as described, to reduce the response of the apparatus by reducing the amplitude of the limited chrominance signal, the gating signal, or both.

What is claimed is:

1. In a system for processing color television signals including chrominance signals having a phase representative of hue and an amplitude representative of saturation of colors present in a scene, said television signals further including a reference subcarrier signal having a nominal phase relative to said chrominance signals, hue correction apparatus comprising:

means having at least a first input responsive to said reference subcarrier signal and at least a second input responsive to said chrominance signals for providing a gating signal representative of a phase relationship between said chrominance signals and chrominance signals representative of flesh tones as determined by the nominal phase of said reference subcarrier;

signal modulating means responsive to said chrominance signals and to said gating signal for passing a selected amplitude portion of said chrominance signals;

signal combining means responsive to said reference subcarrier signal and to said selected amplitude portion of said chrominance signals for providing a corrected reference subcarrier having a phase modified towards the phase of said chrominance signals according to said selected amplitude portion of said chrominance signals; and control means responsive to the amplitude of said chrominance signals for providing a control signal for reducing the amplitude of said selected amplitude portion of said chrominance signals so as to reduce the correction of said reference subcarrier phase in the presence of chrominance signals having an amplitude representative of relatively saturated colors.

2. Apparatus according to claim 1, wherein said chrominance signals exhibit a phase within a normal phase correction range of said apparatus.

3. Apparatus according to claim 2, wherein:
said means for providing a gating signal comprises a phase detector having a relatively wide bandwidth for detecting phase differences between said applied chrominance signals and a reference phase corresponding to flesh tones and for providing a gating signal representative of a phase relationship of said chrominance signal to a reference phase corresponding to flesh tones.

4. Apparatus according to claim 3 and further comprising:
signal limiting means responsive to said chrominance signals for removing amplitude variations therefrom to provide an amplitude limited output signal; and
means for coupling said amplitude limited output signal to said modulating means, said modulating means selecting, in response to said gating signal, a portion of said amplitude limited output signal.

5. Apparatus according to claim 4, wherein:
said control signal is coupled to at least one of said phase detector means and said signal limiting means for modifying the conduction thereof so as to reduce the amplitude of signals provided by said one means in the presence of said chrominance signals representative of saturated colors.

6. Apparatus according to claim 5, wherein:
said control signal is coupled to said phase detector means and to said signal limiting means.

7. Apparatus according to claim 6, wherein:
said phase detector means and said signal limiting means include current source means for supplying operating currents for said phase detector means and said signal limiting means; and
said control signal is coupled to said current source means.

8. Apparatus according to claim 1, wherein said control means comprises:
means for detecting the peak amplitude of said chrominance signal.

9. Apparatus according to claim 8 and further comprising:
bias means for determining the operation of said control means so that said control signal is provided when the amplitude of said chrominance signal exceeds a predetermined level.

10. Apparatus according to claim 9, wherein said peak detector means comprises:
filter means;
transistor means having an input electrode coupled to said chrominance signals, a common electrode coupled to said filter means, and an output electrode for providing detected chrominance signals corresponding to said control signal; and
said bias means being coupled to said transistor means.

11. Apparatus according to claim 10, wherein:
said transistor means comprises an NPN conductivity type transistor; and
said input, common and output electrodes respectively correspond to base, emitter and collector electrodes.

* * * * *